(12) United States Patent
Hovmalm et al.

(10) Patent No.: US 7,589,631 B2
(45) Date of Patent: Sep. 15, 2009

(54) ADAPTIVE AUDIO SIGNALS IN PORTABLE COMMUNICATIONS DEVICES

(75) Inventors: Claes Hovmalm, Lund (SE); Per Olof Hiselius, Lund (SE); Magnus Hansson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 398 days.

(21) Appl. No.: 11/467,259

(22) Filed: Aug. 25, 2006

(65) Prior Publication Data

US 2007/0285234 A1 Dec. 13, 2007

Related U.S. Application Data

(60) Provisional application No. 60/804,338, filed on Jun. 6, 2006.

(51) Int. Cl.
*G08B 13/00* (2006.01)
(52) U.S. Cl. .................................................. 340/566
(58) Field of Classification Search ................ 340/566, 340/692, 384.1, 392.3; 455/412.2, 550
See application file for complete search history.

(56) References Cited

U.S. PATENT DOCUMENTS 4,254,303 A * 3/1981 Takizawa .................... 381/107

| | | | |
|---|---|---|---|
| 6,233,462 B1 * | 5/2001 | Kanai | 455/567 |
| 2003/0179887 A1 | 9/2003 | Cronin | |
| 2004/0127198 A1 * | 7/2004 | Roskind et al. | 455/412.2 |
| 2005/0282590 A1 | 12/2005 | Haparnas | |

FOREIGN PATENT DOCUMENTS

| GB | 2 313 978 | 12/1997 |
| WO | 03/007474 | 1/2003 |
| WO | 2004/054213 | 6/2004 |

OTHER PUBLICATIONS

PCT Search Report and Written Opinion, 14 pages, Mar. 6, 2007.

* cited by examiner

*Primary Examiner*—Phung Nguyen
(74) *Attorney, Agent, or Firm*—Harrity & Harrity, LLP

(57) ABSTRACT

A method for adapting a characteristic of an audible signal produced by a portable communication device includes obtaining a measure of the normal conditions in the environment surrounding the device. The method also includes obtaining at least one measure from a sensor on the portable communication device as a response to an audible event, where the measure corresponds to the current condition in the environment surrounding the device. The method further includes adapting a characteristic of the audible signal based on the relationship between the current condition and the normal condition and presenting the audible signal to a user of the portable communication device.

21 Claims, 3 Drawing Sheets

ADAPTIVE AUDIO SIGNALS IN PORTABLE COMMUNICATIONS DEVICES

RELATED APPLICATION

This application claims priority under 35 U.S.C. § 119 based on U.S. Provisional Application Ser. No. 60/804,338, filed Jun. 9, 2006, the disclosure of which is hereby incorporated herein by reference.

TECHNICAL FIELD OF THE INVENTION

The present invention relates to the field of portable communication devices and adaptation of audible signals produced by such devices. More particularly, the present invention relates to a method for adaptation of such audible signals in a portable communication device, a portable communication device arranged for adaptation of such audible signals as well as a computer program product for performing the method.

DESCRIPTION OF RELATED ART

It is well known by those skilled in the art that portable communication devices are able to receive calls requesting voice communication and different types of messages, like SMS (Short Message Service), MMS (Multimedia Messaging Service), etc. The event of receiving an external call or message, etc. is typically notified to a user of the device by means of audible signals sounding from a speaker or a buzzer or the like. It is also well known that events occurring internally in a portable device can be notified to a user in a similar way, i.e., by means of an audible signal sounding from a speaker or a buzzer or the like. Such internal events may, e.g., be meeting notifications from a calendar function and alarm notification from an alarm function or similar.

However, there are many occasions in which an audible signal sounding from a speaker or a buzzer or the like is drowned, attenuated or disturbed by the conditions in the environment surrounding the portable device. In most portable devices, this can be taken care of if the user of the device increases the volume of the audible signal. This is certainly true both for an audible signal notifying a user of an event and for an audible signal reproducing a human voice in a voice communication. However, a notifying audible signal with a high volume is typically perceived as disturbing, inconvenient or awkward in quiet environments, especially near other people. This is also true for an audible signal that reproduces a human voice in a voice communication, since the conversation may be overheard if the volume of the audible signal is too high. In addition, if such an audible signal is too high the user may perceive this as uncomfortable in quiet environments.

This leaves the user of the portable device with a few options. One is to choose an intermediate volume for the audible signal that is suitable in most cases, though too loud in quiet environments and too weak in noisy environments. Another option is to let the user change the volume for the audible signal when the condition surrounding the device changes. However, typically this involves an impractical pushing of buttons, etc.

In view of the above, it would be beneficial to provide a characteristic for the audible signal that is suited to the conditions in the environment currently surrounding the portable device. In particular, it would be beneficial to provide an easy way to obtain a suitable characteristic for the audible signal.

SUMMARY OF THE INVENTION

The present invention is directed to solving the problem of providing a user of a portable device with an audible signal having a characteristic that is conveniently adapted to the conditions in the environment currently surrounding the device.

This is accomplished according to a first aspect of the present invention by providing a method for adapting the characteristic of an audible signal produced by a portable communication device, which portable device is provided with a sounding device for presenting sounds to a user of the device and at least one sensor for detecting at least one condition in the environment surrounding the device.

The method may comprise the steps of obtaining a measure of the normal conditions in the environment surrounding the device; obtaining at least one measure from said sensor as a response to an audible event, which measure corresponds to the current condition in the environment surrounding the device; adapting the characteristic of the audible signal depending on the relation between said current condition and said normal condition; and presenting the audible signal by means of the sounding device.

A second aspect of the present invention includes the features of the first aspect, with the addition that the sensor or sensors is/are at least one of: a microphone, a keypad, a light detector or an accelerometer.

A third aspect of the present invention includes the features of the second aspect, wherein a measure of the normal sound condition in the environment surrounding the device is obtained; at least one measure from said microphone is obtained as a response to an audible event, which measure corresponds to the current sound condition in the environment surrounding the device; the characteristic of the audible signal is adapted depending on the relation between said current condition and said normal condition.

A fourth aspect of the present invention includes the features of the third aspect, wherein the volume of the audible signal is increased if the volume of the current sound is higher than the volume of the normal sound; and the volume of the audible signal is decreased if the volume of the current sound condition is lower than the volume of the normal sound condition.

A fifth aspect of the present invention includes the features of the third aspect, wherein the energy in the higher frequency spectrum of the audible signal is increased if the energy in the higher frequency spectrum of the current sound is less than the energy in the lower frequency spectrum of the current sound.

A sixth aspect of the present invention includes the features of the second aspect, wherein a measure of the normal light condition in the environment surrounding the device is obtained; at least one measure from said light detector is obtained as a response to an audible event, which measure corresponds to the current light condition in the environment surrounding the device; the characteristic of the audible signal is adapted depending on the relation between said current condition and said normal condition.

A seventh aspect of the present invention includes the features of the sixth aspect, wherein the volume of the audible signal is decreased or shut off if the intensity the current light is higher than the intensity of the normal light.

An eight aspect of the present invention includes the features of the second aspect, wherein a measure of the normal sound and light condition in the environment surrounding the device is obtained; at least one measure from said microphone and said light detector is obtained as a response to an audible event, which measures correspond to the current sound and light condition in the environment surrounding the device; the characteristic of the audible signal is adapted depending on the relation between said current conditions and said normal conditions.

A ninth aspect of the present invention includes the features of the eight aspect, wherein the volume of the audible signal is decreased or shut off if the volume of the current sound is higher than the volume of the normal sound, and the intensity the current light is higher than the intensity of the normal light.

A tenth aspect of the present invention includes the features of any of the aspects above with the addition that said portable device is a phone.

An eleventh aspect of the present invention provides a portable communication device comprising a sound handling unit coupled to a sounding device for presenting sounds to a user of the device, and to at least one sensor for detecting at least one condition in the environment surrounding the device.

The sound handling unit of the portable communication device is adapted to obtain a measure of the normal conditions in the environment surrounding the device; obtain at least one measure from said sensor as a response to an audible event, which measure corresponds to the current condition in the environment surrounding the device; adapt the characteristic of the audible signal depending on the relation between said current condition and said normal condition; and present the audible signal by means of the sounding device.

A twelfth aspect of the present invention includes the features of the eleventh aspect, with the addition that the sensor or sensors is/are at least one of: a microphone, a keypad, a light detector or an accelerometer.

A thirteenth aspect of the present invention includes the features of the twelfth aspect, wherein the sound handling unit is adapted to obtain a measure of the normal sound condition in the environment surrounding the device; obtain at least one measure from said microphone as a response to an audible event, which measure corresponds to the current sound condition in the environment surrounding the device; adapt the characteristic of the audible signal depending on the relation between said current condition and said normal condition.

A fourteenth aspect of the present invention includes the features of the thirteenth aspect, wherein the sound handling unit is adapted to increase the volume of the audible signal if the volume of the current sound is higher than the volume of the normal sound; and decrease the volume of the audible signal if the volume of the current sound condition is lower than the volume of the normal sound condition.

A fifteenth aspect of the present invention includes the features of the thirteenth aspect, wherein the sound handling unit is adapted to increase the energy in the higher frequency spectrum of the audible signal if the energy in the higher frequency spectrum of the current sound is less than the energy in the lower frequency spectrum of the current sound.

A sixteenth aspect of the present invention includes the features of the twelfth aspect, wherein the sound handling unit is adapted to obtain a measure of the normal light condition in the environment surrounding the device; obtain at least one measure from said light detector as a response to an audible event, which measure correspond to the current light condition in the environment surrounding the device; adapt the characteristic of the audible signal depending on the relation between said current condition and said normal condition.

A seventeenth aspect of the present invention includes the features of the sixteenth aspect, wherein the sound handling unit is adapted to decrease or shut off the volume of the audible signal if the intensity the current light is higher than the intensity of the normal light.

An eighteenth aspect of the present invention includes the features of the eleventh aspect, wherein the sound handling unit is adapted to obtain a measure of the normal sound and light condition in the environment surrounding the device; obtain at least one measure from said microphone and said light detector as a response to an audible event, which measures corresponds to the current sound and light condition in the environment surrounding the device; and adapt the characteristic of the audible signal depending on the relation between said current conditions and said normal conditions.

A nineteenth aspect of the present invention includes the features of the thirteenth aspect, wherein the sound handling unit is adapted to decreased or shut off the volume of the audible signal if the volume of the current sound is higher than the volume of the normal sound, and the intensity the current light is higher than the intensity of the normal light.

A twentieth aspect of the present invention includes the features of the twelfth to the eighteenth aspects wherein said portable device is a phone.

A twenty-first aspect of the present invention provides a program product comprising a computer readable medium, having thereon computer program code means, to make a portable communication device execute—when said program is loaded in the portable communication device, which portable device comprises a sound handling unit coupled to a sounding device for presenting sounds to a user of the device and to at least one sensor for detecting at least one condition in the environment surrounding the device—the steps of: obtaining a measure of the normal conditions in the environment surrounding the device; obtaining at least one measure from said sensor as a response to an audible event, which measure correspond to the current condition in the environment surrounding the device; adapting the characteristic of the audible signal depending on the relation between said current condition and said normal condition; presenting the audible signal by means of the sounding device.

A twenty-second aspect of the present invention provides a computer program element comprising computer program code means to make a portable communication device execute—when said program element is loaded in the portable communication device, which portable device comprises a sound handling unit coupled to a sounding device for presenting sounds to a user of the device, and to at least one sensor for detecting at least one condition in the environment surrounding the device—the steps of: obtaining a measure of the normal conditions in the environment surrounding the device; obtaining at least one measure from said sensor as a response to an audible event, which measure corresponds to the current condition in the environment surrounding the device; adapting the characteristic of the audible signal depending on the relation between said current condition and said normal condition; and presenting the audible signal by means of the sounding device.

It should be emphasized that the steps preformed by the invention, which are described herein, must not necessarily be performed in the order in which they are listed in this description or in the appended claims.

Aspects of the invention provide, among other things, the following advantages. It allows an adaptation of the audible signal in a convenient manner to the conditions in the environment currently surrounding the portable communication device. This makes it possible to give the audible signal an improved audibility in a vast variety of situations occurring in the environment surrounding the portable communication device. In addition, this makes it possible to adapt the audible signal so as to reduce its disturbing effect on the environment.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
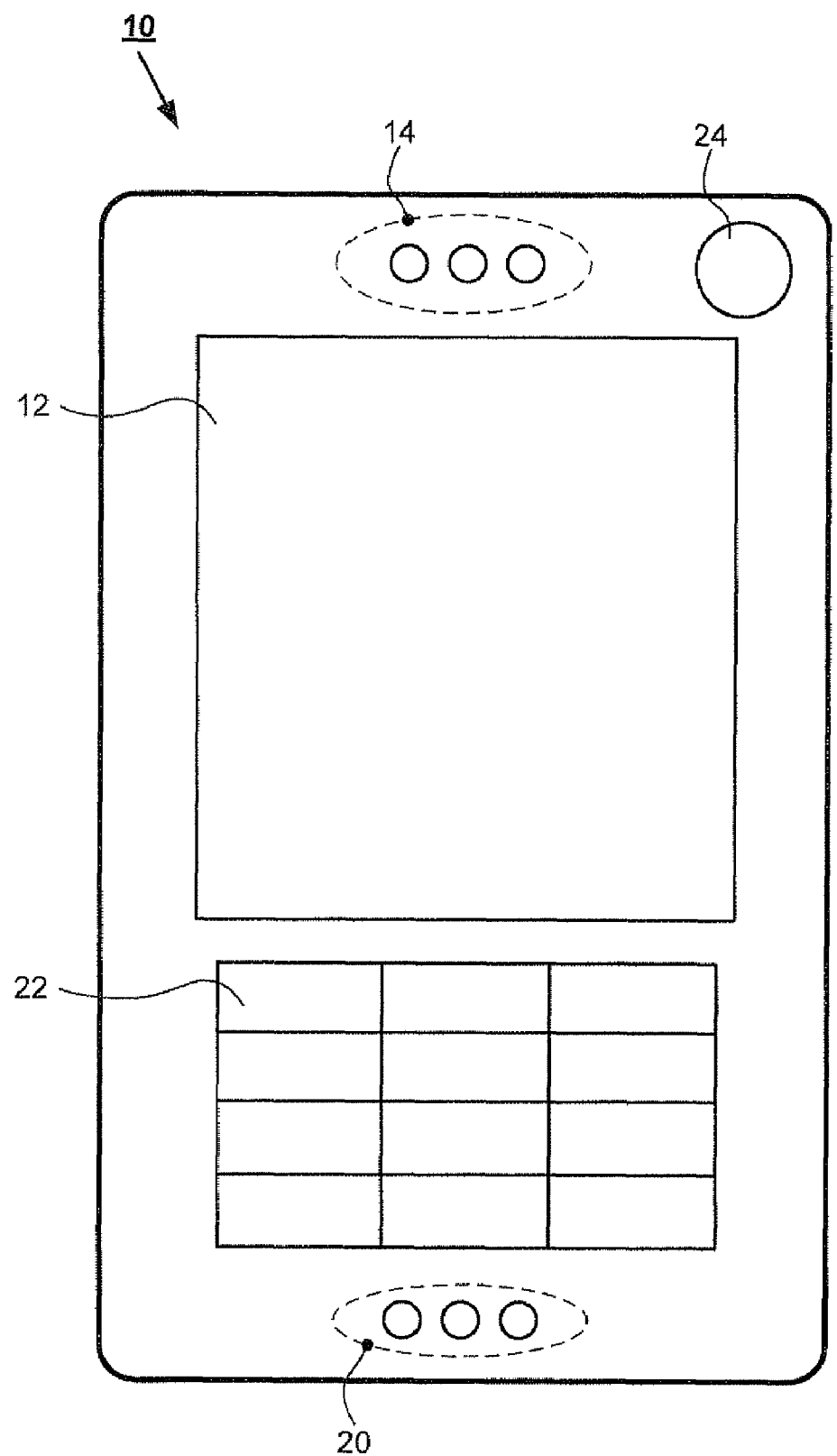
FIG. 1 shows a portable communication device in the form of a cellular phone.

A portable communication device 10 according to the invention is shown in FIG. 1. In the preferred embodiment, the device is a cellular phone 10 having a display 12 and a keypad 22 including a number of keys. The keypad 22 is used for entering information such as selection of functions and responding to prompts and the display 12 is used for displaying functions and prompts to a user of the phone 10. The phone 10 also includes an antenna, which is used for communication with other users via a network. However, the antenna may be built into the phone and hence is not shown in FIG. 1. The phone also includes a speaker 14 for presenting sounds to a user.

In addition, the phone 10 comprises sensors. In particular, the phone 10 comprises a microphone 20 for sensing sounds in the environment surrounding the cellular phone 10, including sounds from a user of the phone 10. Moreover, the cell phone 10 may include a camera 24, e.g., a Charge-Coupled Device (CCD), for sensing incident light so as to enable pictures and/or movie shots to be recorded. Indeed, even the keys on the keypad 22 can be perceived as sensors sensing the touches or touch patterns from a user.

A cellular phone is just one example of a portable device in which the invention can be implemented. The invention can, for instance, also be used in a PDA (personal digital assistant), a palm top computer, a lap top computer or a smartphone.

Figure 2:
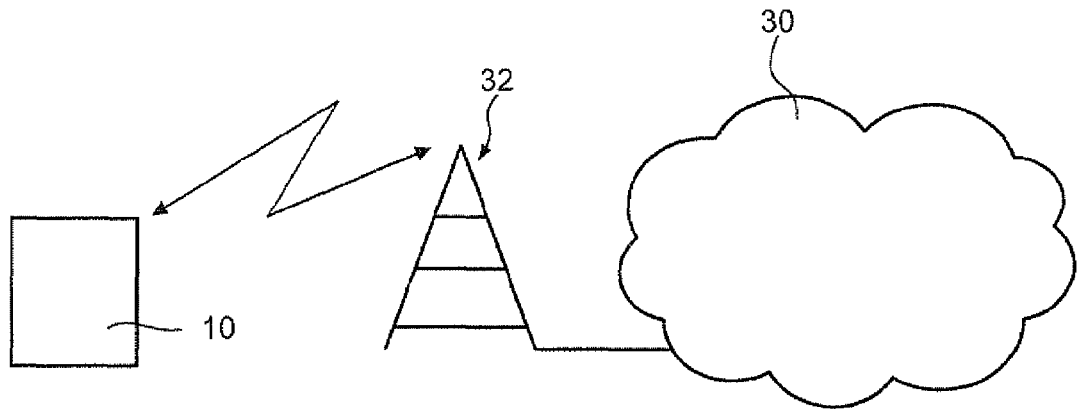
FIG. 2 shows the phone in FIG. 1 connected to a cellular network.

FIG. 2 shows the cellular phone 10 connected to a cellular network 30 via a base station 32. The network 30 is typically a GSM or a GPRS network, or any other 2G, 2.5G or 2.75G network. It is of course also possible that the network is a 3G network, such as a WCDMA network. However, the network does not have to be a cellular network but can be some type of network, such as Internet, a corporate intranet, a LAN or a wireless LAN.

Figure 3:
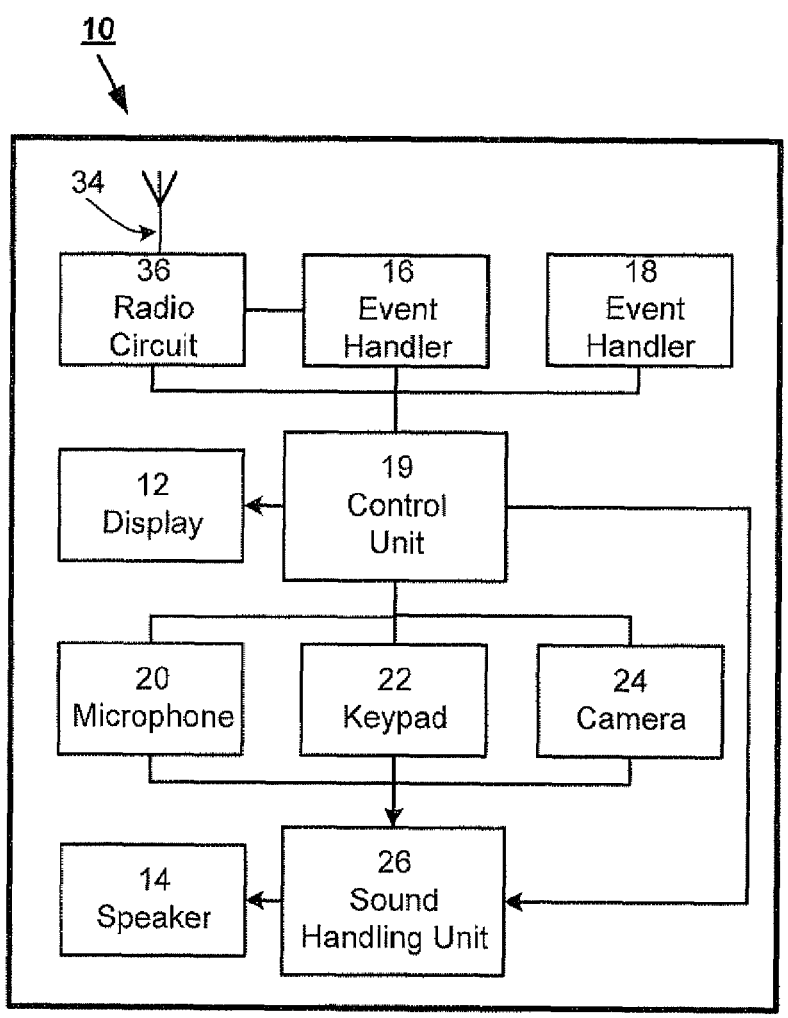
FIG. 3 shows a block schematic of the relevant parts of the phone in FIG. 1.

FIG. 3 shows part of the interior of the cellular phone 10 that is relevant for the present invention. As previously explained, it is preferred that the phone 10 comprises a display 12, a loudspeaker 14, a microphone 20, a keypad 22 and a camera 24.

Before proceeding, it should be emphasized that the loudspeaker 14 may be a conventional loudspeaker or a piezoelectric or electrostatic loudspeaker, or any other suitable electromechanical transducer which converts an electrical signal into sound. Moreover, the loudspeaker 14, schematically illustrated as a single unit in FIG. 3, may in some embodiments represent a loudspeaker system comprising one or several loudspeakers or electromechanical transducers which convert an electrical signal into sound. For example, a conventional loudspeaker or a piezoelectric loudspeaker may be utilized for presenting a human voice to a user of the phone 10 in ongoing phone conversations, whereas a buzzer or similar device may be used for presenting a notification to the user in case of an incoming call or in case of some other event that is to be notified to the user.

The phone 10 may also include an antenna 34 connected to a radio circuit 36 for enabling radio communication with the network 30 in FIG. 2. The radio circuit 36 is in turn connected to a first event handling unit 16.

The first event handling unit 16 is preferably a communication unit for handling such events as incoming and outgoing communication with external units via the network 30. In particular, the first event handling unit 16 handles such events as incoming calls, messages (e.g., SMS or MMS) or similar that are normally notified and/or communicated to a user of the phone 10 by means of audible signals. For example, in case of an incoming call, the audible signals may be ring tones, short music pieces, voice-messages or similar. In addition, in case of an established communication with an external unit, the audible signal may simply be the reproduced voice from a calling person. It is preferred that the audible signal is presented to the phone user by means of the loudspeaker 14 or similar. However, buzzers and other electromechanical transducers may be used as a complement or as an alternative to the loudspeaker 14, in which case the whole system would be represented by the single loudspeaker 14 schematically illustrated in FIG. 3.

In addition, the phone 10 includes a second event handling unit 18. The second event handling unit 18 is preferably a control unit for handling events produced by internal functions in the phone 10. Events produced by internal functions in the phone 10 may, for example, be meeting notifications from a calendar function, alarm notifications from an alarm function or any other notification from an internal function that is to be notified and/or communicated to the user by means of an audible signal, e.g., ring tones, short music pieces or voice-messages, etc.

The phone 10 is also provided with a control unit 19 for controlling and supervising the operation of the phone 10. The control unit 19 may be implemented by means of hardware and/or software, and it may be comprised by one or several hardware units and/or software modules, e.g., one or several processor units provided with or having access to the software and hardware appropriate for the functions required by the phone 10, as is well known by those skilled in the art. In particular, as illustrated in FIG. 3, it is preferred that the control unit 19 is connected to the display 12, the first event handling unit 16, the second event handling unit 18, microphone 20, the keypad 22, the camera 24 and the radio unit 36. This enables the control unit 19 to control and communicate with these units so as to, for example, exchange information and instructions with these units.

The phone 10 is particularly provided with a sound handling unit 26 for controlling the character of the audible signal presented via the speaker 14 to a user of the phone 10. The sound handling unit 26 may be implemented by means of hardware and/or software, and it may be comprised by one or several hardware units and/or software modules, e.g., one or several processor units provided with or having access to the software and hardware appropriate for the functions required. In fact, some embodiments may incorporate the whole or at least parts of the sound handling unit 26 into the control unit 19. However, as illustrated in FIG. 3, the sound handling unit 26 is advantageously perceived as a separate unit, which is connected to the control unit 19 for receiving a signal corresponding to the audible signal to be presented to a user of the phone 10 by means of the speaker 14 connected to the phone 10. It is further preferred that the sound handling unit 26 is connected to the microphone 20, tic keypad 22 and the camera 24 for receiving information about the conditions in the environment surrounding the phone 10. In this respect, the microphone 20, the keypad 22 and the camera 24 can be perceived as sensors for sensing the conditions in the environment surrounding the phone 10. Additional sensors may be present, such as, for example, an accelerometer for sensing movements imposed on the phone 10. It should be understood that the signals from the sensors 20, 22, 24 or other sensors must not necessarily be provided directly to the sound handling unit 26. On the contrary, the signals may, for example, be exposed to signal processing, etc., before the signals are actually used by the sound handling unit 26.

Before proceeding, it should be emphasized that in addition to the ones shown in FIG. 3 there may be further parts and units present in the phone 10. The parts and units shown in FIG. 3 may also be connected to more parts and units than illustrated.

Figure 4:
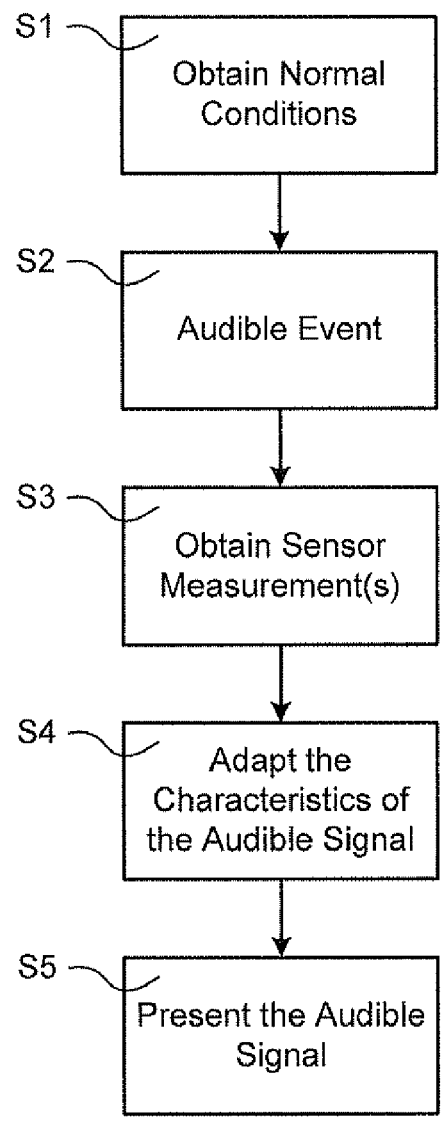
FIG. 4 shows a flow chart of a method according to a preferred embodiment of the invention.

We will now turn the attention to the function of an exemplifying embodiment of the present invention, which will be described with reference to the previously described FIG. 1-3 together with FIG. 4 showing a flow chart of a preferred embodiment consistent with the invention.

The phone 10 according to an embodiment of the invention is adapted to send as well as receive phone calls and messages and similar information using the first event handler 16 in combination with the radio circuit 36 and the antenna 34. In particular, in the event of receiving a call, a message or similar external information this can be notified and/or communicated to the user by means of audible signals sounding from the speaker 14. As is well known to those skilled in the art, this can be accomplished, for example, by means of a control unit (e.g., the control unit 19) connected to a radio circuit (e.g., the radio circuit 36), an event handler (e.g., the first event handler 16) and an electromechanical transducer which converts an electrical signal into sound (e.g., the loudspeaker 14), possibly in cooperation with a memory unit or similar storage for storing different sound signals.

Similarly, the phone 10 according to an embodiment of the invention can produce internal events, such as meeting notifications from a calendar function, alarms from an alarm function or similar that are notified and/or communicated to the user by means of audible signals sounding from the speaker 14. Again, as is well known in the art, this can be accomplished, for example, by means of a control unit (e.g., the control unit 19) connected to an event handler (e.g., the second event handler 18) and an electromechanical transducer which converts an electrical signal into sound (e.g., the loudspeaker 14), possibly in cooperation with a memory unit or similar storage for storing different sound signals.

In a first step S1 performed by the sound handling unit 26 according to an embodiment of the invention, a measure of the normal condition(s) in the environment surrounding the phone 10 is obtained. For example, the normal condition may be represented by a mean value or a median or any other suitable normal representation of a number of measures sampled by the sound handling unit 26 in the past from a particular sensor, e.g., uniformly sampled (e.g., every 1, 2, 3, 5, 10 or 15 minutes) during the last minute, last five minutes, last fifteen minutes, last half hour, or last twenty-four hours or any other suitable period. However, a measure of the normal condition(s) surrounding the phone 10 may alternatively be obtained, at least to some extent, by empirical knowledge of the different environments wherein the phone 10 is typically used. In this learning stage, it may be assumed that the user has configured the audible signal to be presented by the speaker 14 to his/her satisfaction, i.e., the user has configured the character of the audible signal so as to, in his/her opinion, fit normal conditions. This audible signal can then be adapted to the current condition in the environment surrounding the phone 10 according to the exemplifying method now discussed. Naturally, a configuration of the audible signal so as to fit normal conditions can be accomplished in alternative ways, e.g., by empirical knowledge of the audible signal that in the opinion of most users fits normal conditions.

In a second step S2, an external or internal audible event has occurred. The event may, for example, be an incoming call or message, e.g., Short Message Service (SMS) or a Multi Media Messaging Service (MMS). The event may also be a notification from the calendar or alarm function within the phone 10 or any other function within the phone 10. Here, it is assumed that the audible event is an event that is to be notified and/or communicated to the user by means of an audible signal sounding from the speaker 14. Naturally, not all events are audible events, at least not each time the event occurs. For example, the user may turn off the speaker 14 and use a vibrator function instead. The occurrence of an audible event—external or internal—causes the control unit 19 to transmit a message to the sound handling unit 26 indicating that the sound handling unit 26 is supposed to provide the loudspeaker 14 with an audible signal to be sounded by the speaker 14. The message from the control unit 19 may comprise a basic signal, which may be subsequently modified by the sound handling unit 26. The message may alternatively comprise some other indication of the basic signal to be used by the sound handling unit 26, e.g., the identifier of a music piece to be retrieved from a memory by the sound handling unit 26. The precise manner in which the signal is identified and made available to the sound handling unit 26 is less important. The important thing is that the sound handling unit 26 is able to process the signal to be transmitted as an audible signal by the loudspeaker 14.

In a third step S3, the sound handling unit 26 obtains at least one measure from at least one of the above mentioned sensors, which measure(s) correspond to the current condition(s) in the environment surrounding the phone 10. Hence, the sound handling unit 26 obtains a measure from at least one of the microphone 20, the keypad 22 and/or the camera 24 or any other suitable sensor associated with or included in phone 10. The obtaining of a measure from a sensor will be further discussed below.

In a fourth step S4, the obtained measure(s) from one or several sensors form a base from which the characteristic of said audible signal is adapted. The adaptation depends on the relation between the current environmental condition(s) surrounding the phone 10 detected by said sensor(s) and the normal environmental condition(s) surrounding the phone 10. The nature of the adaptation will be further discussed below.

In a fifth step S5 performed by the sound handling unit 26 according to an embodiment of the present invention, the adapted audible signal is presented by means of the loudspeaker 14 forming a sound that can be heard by the user of the phone 10.

We will now proceed with a discussion of some alternative embodiments of the present invention and in particular the obtaining of measures by sensors and the adaptation of the characteristic of the audible signal performed by these embodiments.

In a first example, the microphone 20 is used as a sensor, which makes it possible for the sound handling unit 26 to measure the volume, the frequency spectrum and other properties of the sound currently surrounding the phone 10. The obtained measure can be compared to the level of sound and the frequency spectrum, etc., of the sound that is normally surrounding the phone 10. A measure of the sound that is normally surrounding the phone 10 can, e.g., be obtained by a number of measures sampled in the past or by empirical knowledge, as described above in connection with the first step S1 of the method. The frequency spectrum of the sound sensed by the microphone 20 may, e.g., be retrieved by means of a Fast Fourier Transform (FFT) algorithm or simply by using a plurality of band-pass filters. The above is preferably accomplished by the sound handling unit 26.

It should be added that the microphone 20 in the phone 10 is typically adapted to detect the sound from a human voice and its frequency sensitivity is therefore typically chosen based on this parameter/requirement. The frequency sensitivity of the microphone 20 may therefore be limited so as to only cover the range of, e.g., 300-3400 Hz or any other suitable wider or narrower range that covers the frequency range of the human voice.

Now, if the volume of the measured sound currently surrounding the phone 10 is higher than the volume of the sound normally surrounding the phone 10, then the audible signal to be transmitted by the loudspeaker 14 can be increased by the sound handling unit 26, and if the volume of the sound currently surrounding the phone is lower than the volume of the sound normally surrounding the phone 10, then the audible signal can be decreased by the sound handling unit 26. In this way, the ring tones and similar notification signals can be adapted to the environment so as to be loud and penetrating in loud environments and at the same time suitable discrete, but still informative in quiet environments.

In case the audible signal is a human voice or similar presented to a user of the phone 10 in an ongoing phone conversation, then the volume of the audible signal can be increased and decreased in the same way as described above in connection with notification signals. Hence, if the volume of the measured sound currently surrounding the phone 10 is higher than the volume of the sound normally surrounding the phone 10, then the audible signal to be transmitted by the loudspeaker 14 can be increased by the sound handling unit 26, and if the volume of the sound currently surrounding the phone is lower than the volume of the sound normally surrounding the phone 10, then the audible signal can be decreased by the sound handling unit 26. A measure of the sound currently surrounding the phone 10 should preferably be made continuously or at least repeatedly during the conversation. In addition, the measure should preferably be adapted so as to eliminate the voice entering the microphone 20 from the user. This may, e.g., be done by only sampling measures from the microphone 20 when the user of the phone 10 is not speaking during the conversation. In this way, the human voice or similar presented to a user of the phone 10 in an ongoing phone conversation can be adapted to the environment so as to be loud and penetrating in loud environments and at the same time suitably discrete, but still informative in quiet environments.

A second example is a variation of the first example, mainly concerning audible signals for notifying a user of an event as a contrast to an audible signal being a human voice in an ongoing phone conversation. Here, it is preferred that the energy in the higher frequency spectrum of the audible signal is increased by the sound handling unit 26 if the energy in the higher frequency spectrum of the sound currently surrounding the phone 10 is less than the energy in the lower frequency spectrum of the sound currently surrounding the phone 10. This is particularly advantageous if the phone 10 is lying in a pocket, in a purse or a similar location. Typically, the clothing or the purse material or similar material attenuates higher frequencies. This will be experienced by the microphone 20 detecting mainly low frequencies from the environment. In that case, the energy in the higher frequency spectrum of the audible signal can be increased by the sound handling unit 26 for enhancing the ability of the higher frequencies to penetrate the attenuating material. This presents an improved audible signal to the user of the phone 10 wherein the attenuating effects from the material in, for example, clothes, purses, etc., has been counteracted or at least reduced.

In the same way, the energy in the lower frequency spectrum of the audible signal may be increased by the sound handling unit 26, if the energy in the lower frequency spectrum of the sound currently surrounding the phone 10 is less than the energy in the higher frequency spectrum of the sound currently surrounding the phone 10.

It should be clarified that the expression "higher frequency spectrum" refers to the upper half or higher of a logarithmic frequency scale of the operative frequency range of the microphone 20 and the loudspeaker 14 respectively, whereas the expression "lower frequency spectrum" refers to the lower half or less of a logarithmic frequency scale of the operative frequency range of the microphone 20 and the loudspeaker 14 respectively. As previously mentioned, it is preferred that the operative frequency range of microphone 20 covers the frequency range of the human voice, i.e., typically a range that is about 300-3400 HZ. Similarly, it is preferred that the operative frequency range of the loud speaker covers the frequency range of the human ear, i.e., typically a range that is smaller than 20-20000 HZ.

A third example is an extension of the second example mainly concerning audible signals for notifying a user of an event—as a contrast to an audible signal being a human voice in an ongoing phone conversation. Here it is preferred that the sound handling unit 26 has access to a plurality of sensors, e.g., the microphone 20 and the camera 24. Using the microphone 20 as a sensor makes it possible to measure and retrieve properties of the sound condition currently surrounding the phone 10 as previously described. Using the camera 24 as a sensor makes it possible for the sound handling unit 26 to measure and retrieve properties of the light condition currently surrounding the phone 10.

The current sound condition obtained by said sound measure can then be compared to the sound condition that is normally surrounding the phone 10 as previously described. The current light condition obtained by said light measure can, in a similar way, be compared to the light condition that is normally surrounding the phone 10. A measure of the light that is normally surrounding the phone 10 can, for example, be obtained by a number of measures sampled in the past or by empirical knowledge, as described above in connection with the first step S1 of the method. However, here it is preferred that emphasis is put on the conditions normally surrounding the phone 10 in the point of time substantially directly after an audible event has occurred and before the audible signal is to be presented to a user of the phone 10. For example, the conditions surrounding the phone 10 a few seconds before the audible signal is presented to the user of the phone 10 can be emphasized for determining the conditions normally surrounding the phone 10. Hence, the sound handling unit 26 should at least obtain at least one measure from the sensors during this period in time for determining said normal conditions.

It may also be added that a measure of the light is accomplished by means of the light sensitive part of the camera 24, e.g., a COD-chip. The measure may be any suitable representation of the signal from this light sensitive part, e.g., a processed value from a plurality of light sensitive units in the light sensitive part, which value may comprise the intensity and/or frequency content of the measured light. It may also be added that in case the camera 24 is protected by a lid, this lid can be made of a material that is transparent or semitransparent for the ambient light.

Now, if the signal-pattern from a sensor as described above (e.g., the microphone 20 and the camera 24) changes, this may indicate that the phone 10 is being picked up. An example of such a change may be found in that the camera 24 or similar light sensor detects a significant increase in the ambient light, which will typically be the case if the phone 10 is picked up from a pocket or bag. Similarly, there may also be a significant increase in the sound level detected by the microphone 20—especially at higher frequencies—if the phone 10 is picked up from a pocket or a bag. If these two conditions are met, it can be assumed that the phone 10 has been picked up, at least if the changes of the signal patterns from the microphone 20 and the camera 24 are clear enough. In addition, if the phone 10 is equiped with an accelerometer for sensing movements, a pick-up would most likely make the accelerometer sense an increase in the movements imposed on the phone 10. If at least two and preferably three of the conditions mentioned above (i.e., an increase in the detected light, detected sound and detected movements) are met, it can be assumed that the phone 10 has been picked up, at least if the changes of the signal patterns are clear enough.

The detection of a pick-up of the phone 10 can, e.g., be utilized to adapt an audible signal used to notify a user of an event. When the user picks up the phone 10 it can be reasonably assumed that he has observed the notification. Thereafter it serves no purpose to present the audible signal. Rather, at this state it is typically preferred that the volume of the audible signal is reduced or that the audible signal is turned off by the sound handling unit 26 so as to reduce the risk of creating unnecessary disturbance of the environment surrounding the phone 10. By adding motion detectors and touch sensitive surfaces to the phone 10, one can make even more accurate decisions regarding an appropriate level of the audible signal.

Figure 5:
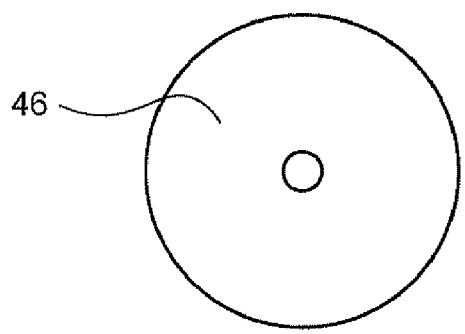
FIG. 5 shows a CD Rom on which program code for executing the method according to the invention is provided.

As previously explained, it is preferred that the sound handling unit 26 is provided in the form of one or more processors with corresponding memory containing the appropriate software in the form of a program code. However, the program code can also be provided on a data carrier such as a CD ROM disc 46 as depicted in FIG. 5 or an insertable memory stick, which will perform the invention when loaded into a computer or into a phone having suitable processing capabilities. The program code can also be downloaded remotely from a server either outside or inside the cellular network or be downloaded via a computer like a PC to which the phone is temporarily connected.

The invention provides, among other things, the following advantages. It allows an adaptation of the audible signal in convenient manner to the conditions in the environment currently surrounding the portable communication device. This makes it possible to give the audible signal an improved audibility in a vast variety of situations occurring in the environment surrounding the portable communication device. In addition, this makes it possible to adapt the audible signal so as to reduce its disturbing effect on the environment.

The present invention has now been described with reference to exemplifying embodiments. However, the invention is not limited to the embodiments described herein. On the contrary, the full extent of the invention is only determined by the scope of the appended claims and their equivalents.

The invention claimed is:

1. A method for adapting a characteristic of an audible signal produced by a portable communication device, the portable device comprising a sounding device for presenting sounds to a user of the device and at least one sensor for detecting at least one condition in the environment surrounding the device, the method comprising:

obtaining a measure of a normal condition in the environment surrounding the device;

obtaining at least one measure from the at least one sensor as a response to an audible event, the measure corresponding to a current condition in the environment surrounding the device;

adapting the characteristic of the audible signal based on the relationship between said current condition and said normal condition; and presenting the audible signal via the sounding device.

2. The method according to claim 1 wherein said sensor is at least one of a microphone, a keypad, a light detector or an accelerometer.

3. The method according to claim 2, wherein the obtaining a measure of a normal condition comprises:

obtaining a measure of the normal sound condition in the environment surrounding the device; wherein the obtaining at least one measure comprises:

obtaining at least one measure from said microphone as a response to an audible event, the at least one measure corresponding to the current sound condition in the environment surrounding the device; and wherein the adapting the characteristic comprises:

adapting the characteristic of the audible signal based on the relationship between said current sound condition and said normal sound condition.

4. The method according to claim 3, wherein the presenting the audible signal comprises:

increasing the volume of the audible signal if the volume of the current sound condition is higher than the volume of the normal sound condition; and decreasing the volume of the audible signal if the volume of the current sound condition is lower than the volume of the normal sound condition.

5. The method according to claim 3, wherein the audible signal comprises a notification signal, and the adapting the characteristic comprises:

increasing the energy in the higher frequency spectrum of the audible signal if the energy in the higher frequency spectrum of the current sound condition is less than the energy in the lower frequency spectrum of the current sound condition.

6. The method according to claim 2, wherein the audible signal comprises a notification signal, the method further comprising:

obtaining a measure of a normal light condition in the environment surrounding the device; and obtaining at least one measure from the light detector as a response to an audible event, the at least one measure corresponding to the current light condition in the environment surrounding the device; wherein the adapting the characteristic comprises:
adapting the characteristic of the audible signal based on the relationship between said current light condition and said normal light condition.

7. The method according to claim 6, wherein the adapting the characteristic comprises:
decreasing or shutting off the volume of the audible signal if the intensity of the current light condition is higher than the intensity of the normal light condition.

8. The method according to claim 2, wherein the obtaining a measure of a normal condition comprises:
obtaining a measure of the normal sound and light conditions in the environment surrounding the device; wherein the obtaining at least one measure comprises:
obtaining at least one measure from said microphone and said light detector as a response to an audible event, the at least one measure corresponding to the current sound and light conditions in the environment surrounding the device; and wherein the adapting the characteristic comprises:
adapting the characteristic of the audible signal based on the relationship between said current sound and light conditions and said normal sound and light conditions.

9. The method according to claim 8, wherein the adapting the characteristic comprises:
decreasing or turning off the volume of the audible signal if the volume of the current sound condition is higher than the volume of the normal sound condition, and the intensity of the current light condition is higher than the intensity of the normal light condition.

10. The method according claim 1 wherein the portable communication device comprises a phone.

11. A portable communication device comprising a sound handling unit, a sounding device for presenting sounds to a user of the device and at least one sensor for detecting at least one condition in the environment surrounding the device, wherein the sound handling unit is configured to:
obtain a measure of a normal condition in the environment surrounding the device;
obtain at least one measure from the at least one sensor as a response to an audible event, the at least one measure corresponding to a current condition in the environment surrounding the device;
adapt a characteristic of the audible signal based on the relationship between said current condition and said normal condition; and
present the audible signal via the sounding device.

12. The portable communication device according to claim 11, wherein the at least one sensor comprises at least one of a microphone, a keypad, a light detector or an accelerometer.

13. The portable communication device according to claim 12, wherein the sound handling unit is configured to:
obtain a measure of the normal sound condition in the environment surrounding the device;
obtain at least one measure from said microphone as a response to an audible event, the measure corresponding to the current sound condition in the environment surrounding the device; and
adapt the characteristic of the audible signal depending on the relationship between said current sound condition and said normal sound condition.

14. The portable communication device according to claim 13, wherein the sound handling unit is configured to:
increase the volume of the audible signal if the volume of the current sound condition is higher than the volume of the normal sound condition; and
decrease the volume of the audible signal if the volume of the current sound condition is lower than the volume of the normal sound condition.

15. The portable communication device according to claim 13, wherein the sound handling unit is configured to:
increase the energy in the higher frequency spectrum of the audible signal if the energy in the higher frequency spectrum of the current sound condition is less than the energy in the lower frequency spectrum of the current sound condition.

16. The portable communication device according to claim 12, wherein the sound handling unit is configured to:
obtain a measure of the normal light condition in the environment surrounding the device;
obtain at least one measure from said light detector as a response to an audible event, the measure corresponding to the current light condition in the environment surrounding the device; and
adapt the characteristic of the audible signal depending on the relationship between said current light condition and said normal light condition.

17. The portable communication device according to claim 16, wherein the sound handling unit is configured to:
decrease or shut off the volume of the audible signal if the intensity the current light condition is higher than the intensity of the normal light condition.

18. The portable communication device according to claim 12, wherein the sound handling unit is configured to:
obtain a measure of the normal sound and light conditions in the environment surrounding the device;
obtain at least one measure from said microphone and said light detector as a response to an audible event, the measure corresponding to the current sound and light conditions in the environment surrounding the device; and
adapt the characteristic of the audible signal based on the relationship between said current sound and light conditions and said normal sound and light conditions.

19. The portable communication device according to claim 18, wherein the sound handling unit is configured to:
decrease the volume of the audible signal or turn off the audible signal if the volume of the current sound condition is higher than the volume of the normal sound condition, and the intensity of the current light condition is higher than the intensity of the normal light condition.

20. The portable communication device according to claim 11, wherein said portable communication device comprises a phone.

21. A program product comprising a data carrier device, having thereon computer program code to make a portable communication device comprising a sound handling unit, a sounding device for presenting sounds to a user of the device, and at least one sensor for detecting at least one condition in the environment surrounding the device, execute, when said computer program code is loaded in the portable communication device, a method comprising:
obtaining a measure of a normal condition in the environment surrounding the device;
obtaining at least one measure from said at least one sensor as a response to an audible event, the measure corresponding to the current condition in the environment surrounding the device;
adapting the characteristic of the audible signal depending on the relationship between said current condition and said normal condition; and
presenting the audible signal via the sounding device.

* * * * *

UNITED STATES PATENT AND TRADEMARK OFFICE
CERTIFICATE OF CORRECTION

PATENT NO. : 7,589,631 B2  Page 1 of 1
APPLICATION NO. : 11/467259
DATED : September 15, 2009
INVENTOR(S) : Claes Hovmalm et al.

It is certified that error appears in the above-identified patent and that said Letters Patent is hereby corrected as shown below:

On the Title Page: Item (60) Provisional application No. 60/804,338, filed Jun. 6, 2006, should read --Provisional application No. 60/804,338, filed Jun. 9, 2006--.

Signed and Sealed this

Third Day of November, 2009

David J. Kappos
*Director of the United States Patent and Trademark Office*